United States Patent [19]
Shpater

[11] Patent Number: 5,287,111
[45] Date of Patent: Feb. 15, 1994

[54] DOPPLER SHIFT MOTION DETECTOR WITH VARIABLE POWER

[75] Inventor: Pinhas Shpater, St-Laurent, Canada

[73] Assignee: Shmuel Hershkovitz, Quebec, Canada

[21] Appl. No.: 933,821

[22] Filed: Aug. 24, 1992

[51] Int. Cl.⁵ ............................................. G01S 13/04
[52] U.S. Cl. ...................................... 342/28; 342/173
[58] Field of Search ................................. 342/28, 173

[56] References Cited

U.S. PATENT DOCUMENTS

| | | |
|---|---|---|
| 4,090,195 | 5/1978 | Guennou et al. ............... 342/28 |
| 4,437,089 | 3/1984 | Achard . |
| 4,636,774 | 1/1987 | Galvin et al. . |
| 4,882,567 | 11/1989 | Johnson . |

FOREIGN PATENT DOCUMENTS 2475742  8/1981  France .

Primary Examiner—T. H. Tubbesing
Attorney, Agent, or Firm—Burns, Doane, Swecker & Mathis

[57] ABSTRACT

The Doppler shift motion detector has an effective motion detection range which can be changed by changing the power level and thus without changing the motion detection circuitry. The Doppler shift motion detector also has a self test for the wave transmitter and receiver which can be carried out without requiring placing a moving object in the monitoring area. The Doppler shift signal generated when the power level is changed is used to check the detector for the self test and is ignored by the detector alarm output circuitry when the power level is changed. An anti-masking feature is also provided.

26 Claims, 3 Drawing Sheets

DOPPLER SHIFT MOTION DETECTOR WITH VARIABLE POWER

Field of the Invention

The present invention relates to a Doppler shift motion detector in which the transmitted power is changed. The invention relates further to a Doppler shift motion detector in which fault detection or range changing is carried out.

Background of the Invention

Doppler shift motion detectors are active motion detectors in which a wave transmitter transmits waves into a monitoring area, and then a wave receiver receives the reflected waves and produces a reception signal. By detecting the Doppler shift in the reflected signal, the detector circuitry detects whether a moving object is present in the area. These detectors are commonly used for security systems.

Most detectors have transmitters which are supplied with power from a fixed or non-variable power supply. One exception to this is a dual detector system, i.e. microwave and passive infrared detector system, described in U.S. Pat. No. 4,882,567, in which the microwave transceiver is kept in an idle state to conserve power until the infrared detector detects an intruder. Once the power is switched to full power or the active state, the microwave motion detect circuitry begins detecting for motion, and if motion is detected, an alarm signal is generated. Since the passive infrared detector uses very little power, the dual detector described can be efficiently powered by battery to avoid running power supply wires during installation.

In known Doppler shift motion detectors, the power supply is regulated to maintain a constant power level. A step change in power will cause a characteristic signal to occur in the receiver signal. This characteristic can adversely influence motion detection, and therefore to avoid false alarms, the power level is kept constant.

Conventional microwave motion detectors can only change their range of effective motion detection by adjusting the gain or by adjusting a threshold level in the alarm detection signal processing circuitry. An example of such a detector is described in French patent publication 2,475,742 (Dreuilhe). Also, testing of the microwave transmitter and receiver requires moving an object within the monitoring area and observing the reception signal.

U.S. Pat. No. 4,636,774 to Galvin et al. describes a detector circuit in which the sensitivity is automatically varied once the detector circuit detects the presence of a person in the area to be monitored.

Summary of the Invention

It is an object of the present invention to provide a Doppler shift motion detector in which an effective motion detection range can be changed without changing the motion detection circuitry. It is also an object of the present invention to provide a Doppler shift motion detector in which a self test for the wave transmitter and receiver can be carried out without requiring placing a moving object in the monitoring area.

According to the invention there is provided a Doppler shift motion detector comprising a Doppler shift transceiver for transmitting waves to a monitoring area, receiving reflected waves, and producing a Doppler shift output signal in response to a phase shift between the transmitted and the received waves, the output signal having a characteristic when there is a change in a power level supplied, a power supply for supplying the level of power to the transceiver, motion detection means for detecting a moving object in the area using the transceiver Doppler shift output signal, and for producing an alarm output, means for causing a change in the level of power supplied to the transceiver, and fault detection means for detecting the characteristic in the output signal and for generating a fault signal when the characteristic is not detected in the transceiver output signal during the change.

According to the invention there is also provided a Doppler shift motion detector comprising a Doppler shift transceiver for transmitting waves to a monitoring area, receiving reflected waves, and producing a Doppler shift output signal in response to a phase shift between the transmitted and the received waves, the output signal having a characteristic when there is a change in a power level supplied, a power supply for supplying the level of power to the transceiver, means for causing a change in the level of power supplied to the transceiver for monitoring at least two ranges in the area; and motion detection means for detecting a moving object in the area using the transceiver Doppler shift output signal, for producing an alarm output and for disregarding the characteristic during the change.

Detailed Description of the Preferred Embodiment

Figure 1:
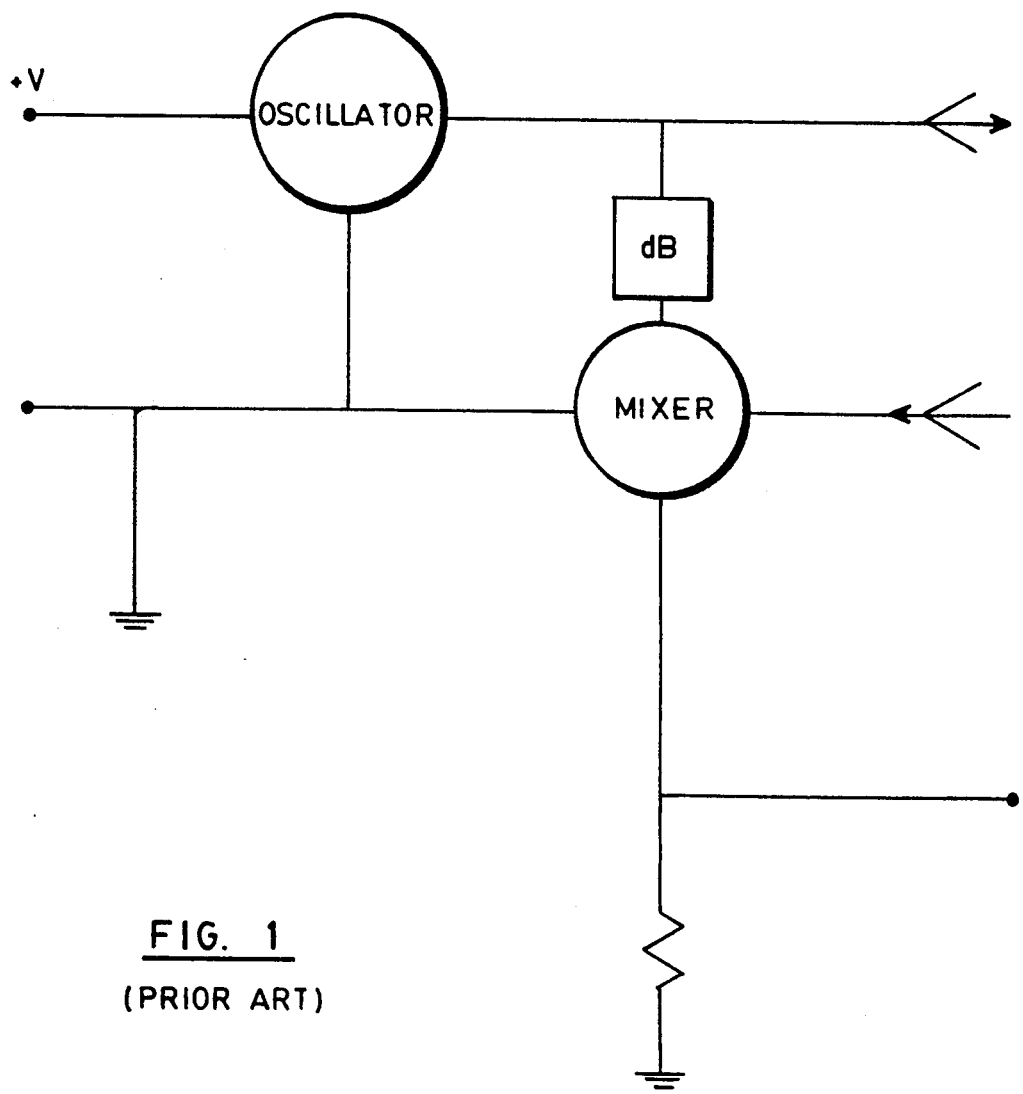
FIG. 1 is a schematic diagram of a Doppler shift motion detector transceiver unit, as known in the art.

With reference to FIG. 1, there is shown a prior art microwave transceiver unit, comprising a microwave frequency oscillator whose output is fed to a transmitting antenna and to a mixer via an attenuator. The mixer multiplies the attenuated oscillator output and the received microwave signal and produces an output (the Doppler output signal) which is relative to the phase difference between the two signals. The Doppler output signal will remain near zero if there are no moving objects in the area from which the reflected microwaves are received.

Figure 2:
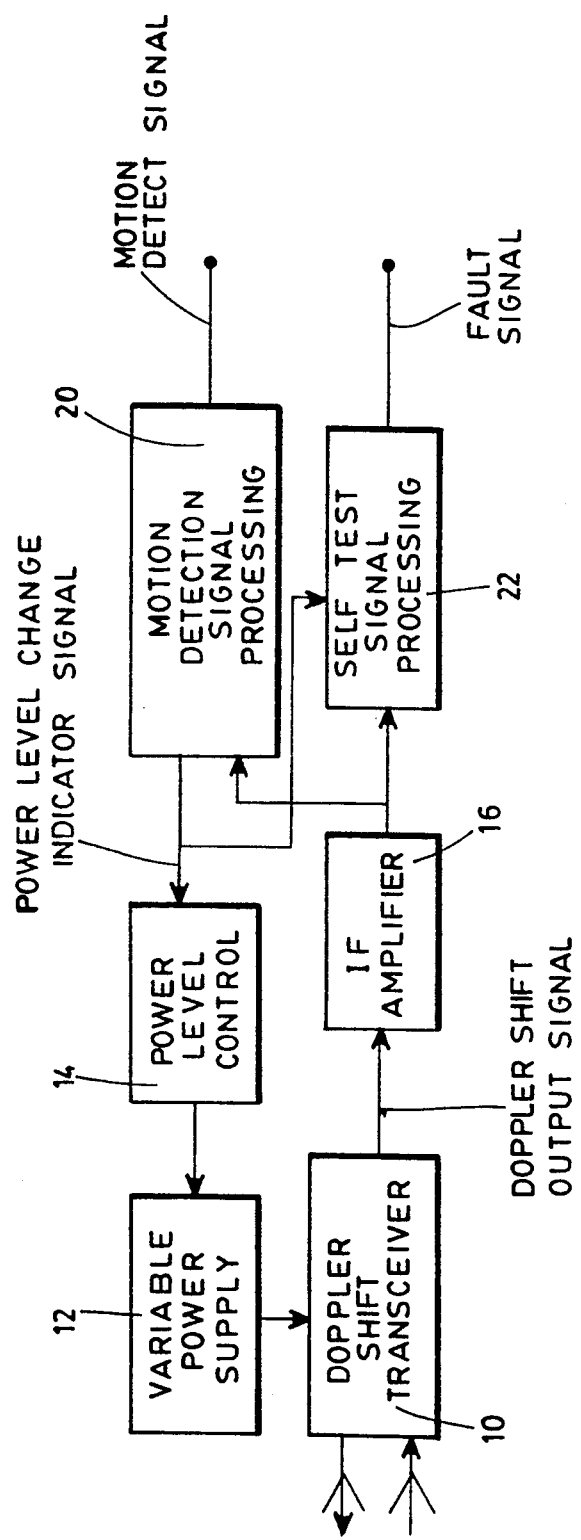
FIG. 2 is a block diagram of a Doppler shift motion detector circuit according to the invention.

With reference to FIG. 2, there is shown a Doppler shift motion detector circuit having a transceiver (10) powered by a variable power supply (12) which is controlled by control circuit (14). Transceiver (10) may be a microwave or ultrasound transceiver, for example. The Doppler shift output signal from the transceiver (10) is fed to motion detection signal processing circuit (20) and fault detect circuit (22). A power level change indicator signal is fed from control circuit (14) to both circuits (20) and (22). The power level change indicator signal lets circuit (20) know that the characteristic in the Doppler output signal will be generated and that the characteristic should be ignored. As for circuit (22), it becomes active upon receipt of the indicator signal, and in the preferred embodiment, a fault signal is generated if the Doppler output signal does not surpass a predetermined threshold during the indicator signal.

When there is a voltage change in the input to the oscillator, the transmitted power changes. Consequently, the received signal changes. The mixer output has a DC component which will also change, however, the AC component remains unchanged, i.e. there is no movement. Nevertheless, the AC amplifier picks up the change in DC level and produces an output signal which can resemble a signal caused by motion.

Figure 3:
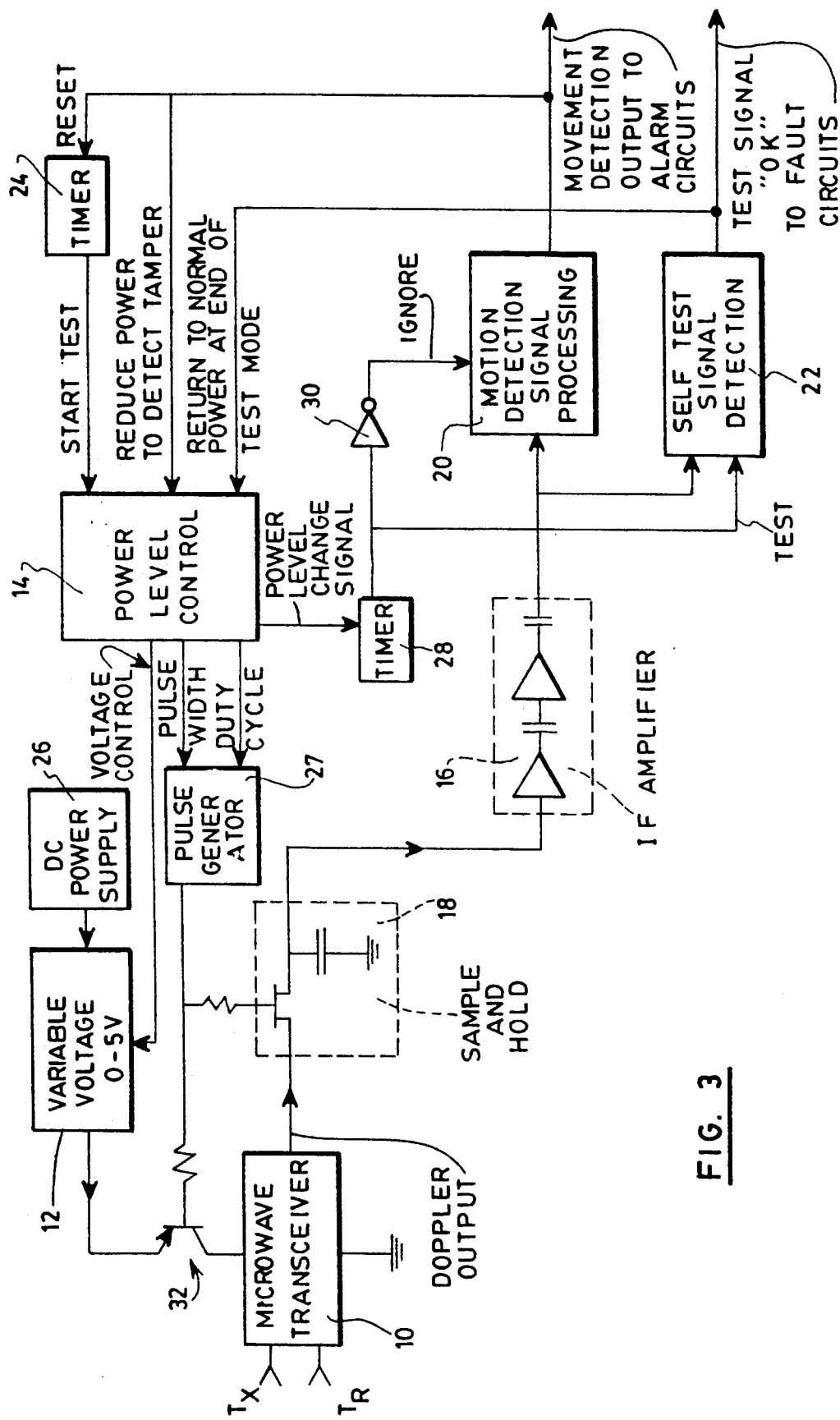
FIG. 3 is a block schematic diagram of the microwave motion detector according to the preferred embodiment.

With reference to FIG. 3, the Doppler shift motion detector according to the preferred embodiment includes a microwave transceiver unit (10) which is powered by a variable power supply (12) itself powered by DC power supply (26) for transmitting microwaves into a monitoring area. Reflected microwaves are then received by the microwave transceiver (10) and a Doppler shift reception signal is fed into amplifier (16) via sample and hold circuit (18). The sample and hold circuit (18) is controlled by the output of pulse generator (27) to sample the receiver output only when the transceiver is active. A power level control circuit (14) provides a voltage control signal to the variable power supply (12) to set the DC voltage supply level. Also a pulse width signal and a duty cycle signal are fed to pulse generator (27) whose output controls switching power transistor (32), such that both the pulse modulated DC power and the peak DC voltage are used to control the average transmitting power level of transceiver (10). In one example, pulse generator (27) may emit pulses at a set frequency, and the power level may be set by adjusting the pulse width of the pulses. Alternatively, the pulses generated can be of a given shape (duration) and the frequency can be adjusted. At the moment that the power level control circuit (14) causes a change in the level of power to be supplied by the variable power supply (12), a power level change signal is output by circuit (14) to a timer circuit (28) to briefly hold the signal which is then fed to fault detect circuit (22) and to motion detection signal processing circuit (20) via inverter (30). The output of amplifier (16) is ignored by circuit (20) for the duration of the power level change signal. The output of amplifier (16) is also fed into fault detector circuit (22).

The motion detect circuit (20) carries out a signal processing and analysis of the amplified signal in order to determine whether an object is moving within the monitoring area. In accordance with predetermined conditions, as are known in the art, an alarm output is generated. For example, circuit (20) can generate an alarm output signal whenever the amplitude of the reception signal exceeds a predetermined threshold level, a predetermined number of times.

In the preferred embodiment, as shown in FIG. 3, the average transceiver DC power level is controlled in a number of ways. First, the DC voltage level is set by variable voltage regulator (12). This DC voltage level may be pulsed to transceiver (10) by using switching transistor (32) in conjunction with a gating pulse coming from pulse generator (27). The pulse generator (27) may control pulse width, duty cycle and frequency in order to control the power supplied to transceiver (10). By enabling the sample and hold circuit (18) using the output of the pulse generator (27), the Doppler output signal is sampled only when the transceiver is powered. Whenever there is a change in the average power supplied to transceiver (10) there will be a corresponding change in the base DC level of the Doppler shift signal. This change in the DC level is amplified by amplifier (16) and produces a characteristic in its output that can be detected by circuit (22) and ignored by circuit (20). Of course, the characteristic generated in the Doppler shift signal when there is a transceiver power level change can be the result of a different feature of the transceiver and/or Doppler shift circuit.

It has been found that a change as little as 5% in the average power level supplied can result in a characteristic that can be reliably detected.

In accordance with the invention, the power level control (14) is used to change a transmitting power level of microwave transceiver (10). When the power level of the microwave transmitter is changed, the Doppler shift reception signal will include the characteristic resulting from the power level change which indicates activity. Since this characteristic could erroneously be interpreted by the motion detect circuit (20) as being motion within the monitoring area, circuit (14) signals circuit (20) to ignore the reception signal from affecting the motion detect circuit. At the same time, the fault detect circuit (22) is turned on and should no characteristic in the reception signal be detected, a fault output signal is generated. Thus if the reception signal does not exceed a predetermined threshold during the level change period determined by the level change signal generated by the control circuit (14), then the fault output is generated. The fault output signal would only be generated if the transceiver was not functioning properly.

In the preferred embodiment, the alarm output resets a timer (24) which at timed intervals sends a start test signal to control circuit (14). For example, if 60 minutes have elapsed without an alarm detection, timer (24) would start the fault self-test by signalling the control circuit (14) to cause a power level fluctuation of 5%. If an alarm signal is generated before timer (24) counts out the 60 min. period, then the timer (24) is reset. Also, when a motion alarm is generated by circuit (20), the alarm output signal is used to signal control circuit (14) to reduce the power level temporarily (about a few seconds) to check whether there is detectable motion in close proximity (a close range of about 0.5 to 1.0 meter) to the transceiver (10) which would be an indication of tamper activity.

Power level control circuit (14) may also cause the variable power supply to change the power level on a regular or random basis in order to expand or contract the monitoring area. Also, fault detection may be carried out simply by causing the variable power supply to undergo a temporary change of power from a first level to a second level and then back to the first level for the purposes of carrying out fault detection using the fault detect circuit (22). Such a fault self-test could be carried out on a regular basis, or whenever the motion detector is turned on or reset.

Although the preferred embodiment involves using a microwave transceiver which generates a signal when the power level is changed as a result of a change in the DC level in the mixer output, it is to be understood that the invention is not limited to this manner in which a signal is generated during the power level change. The power level change could affect another component in the transceiver circuit which would cause an output signal in the transceiver. Also, the invention is not limited to a microwave transceiver, but could also work with other Doppler shift transceivers, such as an ultrasound transceiver.

What is claimed is:

1. A Doppler shift motion detector comprising:

a Doppler shift transceiver for transmitting waves to a monitoring area, receiving reflected waves, and producing a Doppler shift output signal in response to a phase shift between said transmitted and said received waves, said output signal having a characteristic when there is a change in a power level supplied;

a power supply for supplying said level of power to the transceiver;

motion detection means for detecting a moving object in said area using said transceiver Doppler shift output signal, and for producing an alarm output;

means for causing a change in said level of power supplied to said transceiver; and fault detection means for detecting said characteristic in said output signal and for generating a fault signal when said characteristic is not detected in said transceiver output signal during said change.

2. Motion detector as claimed in claim 1, further comprising a timer circuit connected between said alarm output and said means for causing a change in said power level, said timer having a predetermined count time and being reset by said alarm output, whereby fault detection is checked when said time is counted without an alarm output being produced.

3. Motion detector as claimed in claim 1, wherein said means for causing a change comprise means for generating a level change signal for a predetermined time period around said power level change, said level change signal being fed to a test input of said fault detection means, and said fault detection means generate said fault signal if said transceiver output signal remains below a predetermined threshold during the presence of said level change signal.

4. Motion detector as claimed in claim 3, wherein said transceiver comprises means for transmitting and receiving microwaves.

5. Motion detector as claimed in claim 1, wherein said means for causing a change comprise means for generating an ignore signal during a predetermined time period around said power level change, said ignore signal being fed to an ignore input of said motion detection means, and said motion detection means ignoring said transceiver output signal in response to said ignore signal.

6. Motion detector as claimed in claim 5, wherein said transceiver comprises means for transmitting and receiving microwaves.

7. Motion detector as claimed in claim 1, wherein said transceiver comprises means for transmitting and receiving microwaves.

8. Motion detector as claimed in claim 1, wherein said means for causing a change in said level of power comprise a pulse generator and switching means for pulsing power fed from said supply to said transceiver, said pulse generator being adjustable such that said level of power is an average power level determined by a duty cycle of the pulse generator.

9. Motion detector as claimed in claim 16, wherein said pulse generator comprises means for generating pulses having a constant frequency and a variable pulse width.

10. Motion detector as claimed in claim 16 wherein said pulse generator comprises means for generating pulses having a given duration and a variable frequency.

11. A Doppler shift motion detector comprising:

a Doppler shift transceiver for transmitting waves to a monitoring area, receiving reflected waves, and producing a Doppler shift output signal in response to a phase shift between said transmitted and said received waves, said output signal having a characteristic when there is a change in a power level supplied;

a power supply for supplying said level of power to the transceiver;

means for causing a change in said level of power supplied to said transceiver for monitoring at least two ranges in said area; and motion detection means for detecting a moving object in said area using said transceiver Doppler shift output signal, for producing an alarm output and for disregarding said characteristic during said change.

12. Motion detector as claimed in claim 11, further comprising fault detection means for detecting said characteristic in said transceiver output signal during said change, and for generating a fault signal when said characteristic is not detected in transceiver output signal during said change.

13. Motion detector as claimed in claim 12, wherein said transceiver comprises means for transmitting and receiving microwaves.

14. Motion detector as claimed in claim 2, wherein said means for causing a change in said level comprise power level control means connected to said alarm output for reducing said power level for a predetermined period of time after said motion detection means detect said moving object such that said transceiver output signal indicates motion within a close range, whereby if said motion detection means further detect said moving object within said predetermined time period, it can be determined that an attempt to mask said transmitter and said receiver has occurred.

15. Motion detector as claimed in claim 14, wherein said transceiver comprises means for transmitting and receiving microwaves.

16. Motion detector as claimed in claim 11, wherein said means for causing a change comprise means for generating an ignore signal during a predetermined time period around said power level change, said ignore signal being fed to an ignore input of said motion detection means, and said motion detection means ignoring said transceiver output signal in response to said ignore signal.

17. Motion detector as claimed in claim 16, wherein said transceiver comprises means for transmitting and receiving microwaves.

18. Motion detector as claimed in claim 11, wherein said transceiver comprises means for transmitting and receiving microwaves.

19. Motion detector as claimed in claim 11, wherein said means for causing a change in said level of power comprise a pulse generator and switching means for pulsing power fed from said supply to said transceiver, said pulse generator being adjustable such that said level of power is an average power level determined by a duty cycle of the pulse generator.

20. Motion detector as claimed in claim 17 wherein said pulse generator comprises means for generating pulses having a constant frequency and a variable pulse width.

21. Motion detector as claimed in claim 17 wherein said pulse generator comprises means for generating pulses having a given duration and a variable frequency.

22. A method of Doppler shift motion detection comprising the steps of:

transmitting waves to a monitoring area using a transceiver;

receiving reflected waves from said area;

producing a Doppler shift transceiver output signal in response to a phase shift between said transmitted and said received waves, said transceiver output signal having a characteristic when there is a change in a power level supplied to the transceiver;

processing and analyzing said transceiver output signal to detect a moving object in said area and producing an alarm output;

changing said level of power supplied to said transceiver; and detecting said transceiver output signal resulting from said change, and generating a fault signal in response to absence of said characteristic.

23. Method as claimed in claim 22, wherein:

said step of changing said level of power comprises changing between at least two power levels for monitoring at least two ranges in said area; and said step of processing and analyzing involves disregarding said transceiver output signal during said change.

24. Method as claimed in claim 22, wherein said steps of transmitting waves and receiving reflected waves comprise respectively steps of transmitting and receiving microwaves.

25. A method of Doppler shift motion detection comprising the steps of:

transmitting waves to a monitoring area using a transceiver;

receiving reflected waves from said area;

producing a Doppler shift transceiver output signal in response to a phase shift between said transmitted and said received waves, said transceiver producing said output signal in response to a change in a power level supplied thereto;

causing a change in said level of power supplied to said transceiver for monitoring at least two ranges in said area; and processing and analyzing said transceiver output signal to detect a moving object in said area, and to produce an alarm output, while disregarding said transceiver output signal during said change.

26. Method as claimed in claim 23, wherein said steps of transmitting waves and receiving reflected waves comprise respectively steps of transmitting and receiving microwaves.

* * * * *